Figure 14:
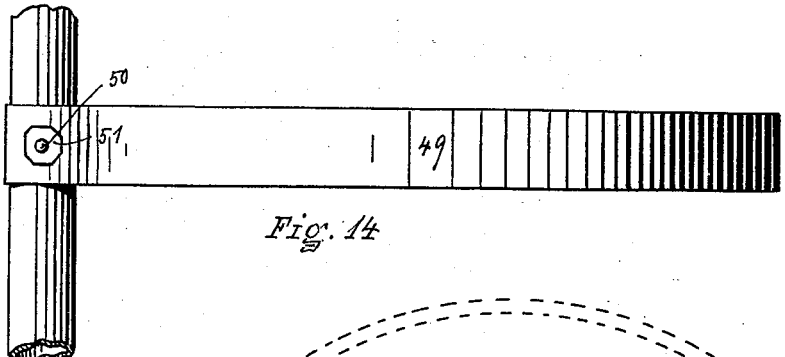

No. 636,371. Patented Nov. 7, 1899.
E. E. WHIPPLE.
LEVER HARROW AND RIDING ATTACHMENT.
(Application filed Mar. 4, 1898.)
(No Model.) 4 Sheets—Sheet 1.
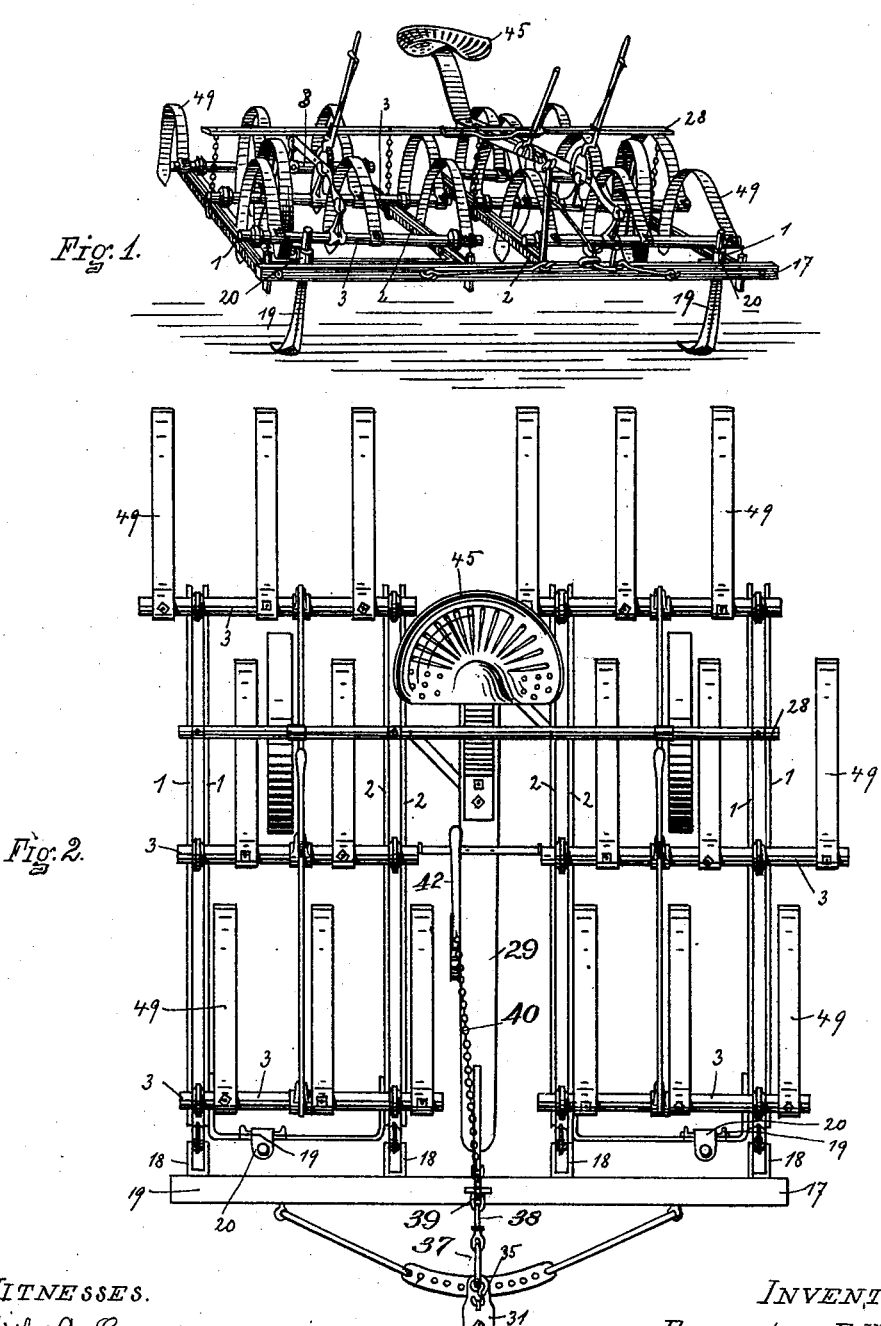

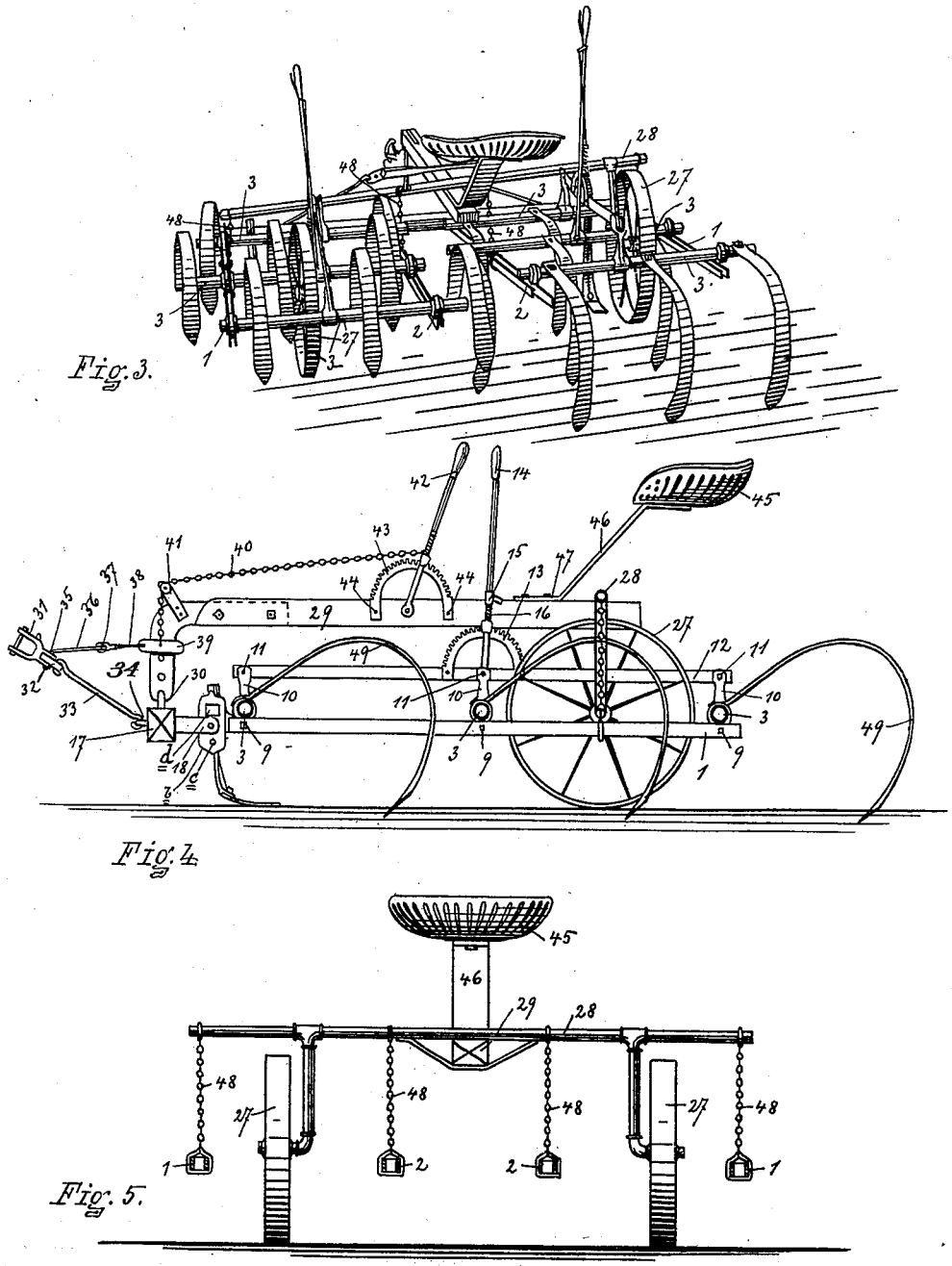

No. 636,371. Patented Nov. 7, 1899.
E. E. WHIPPLE.
LEVER HARROW AND RIDING ATTACHMENT.
(Application filed Mar. 4, 1898.)
(No Model.) 4 Sheets—Sheet 3.
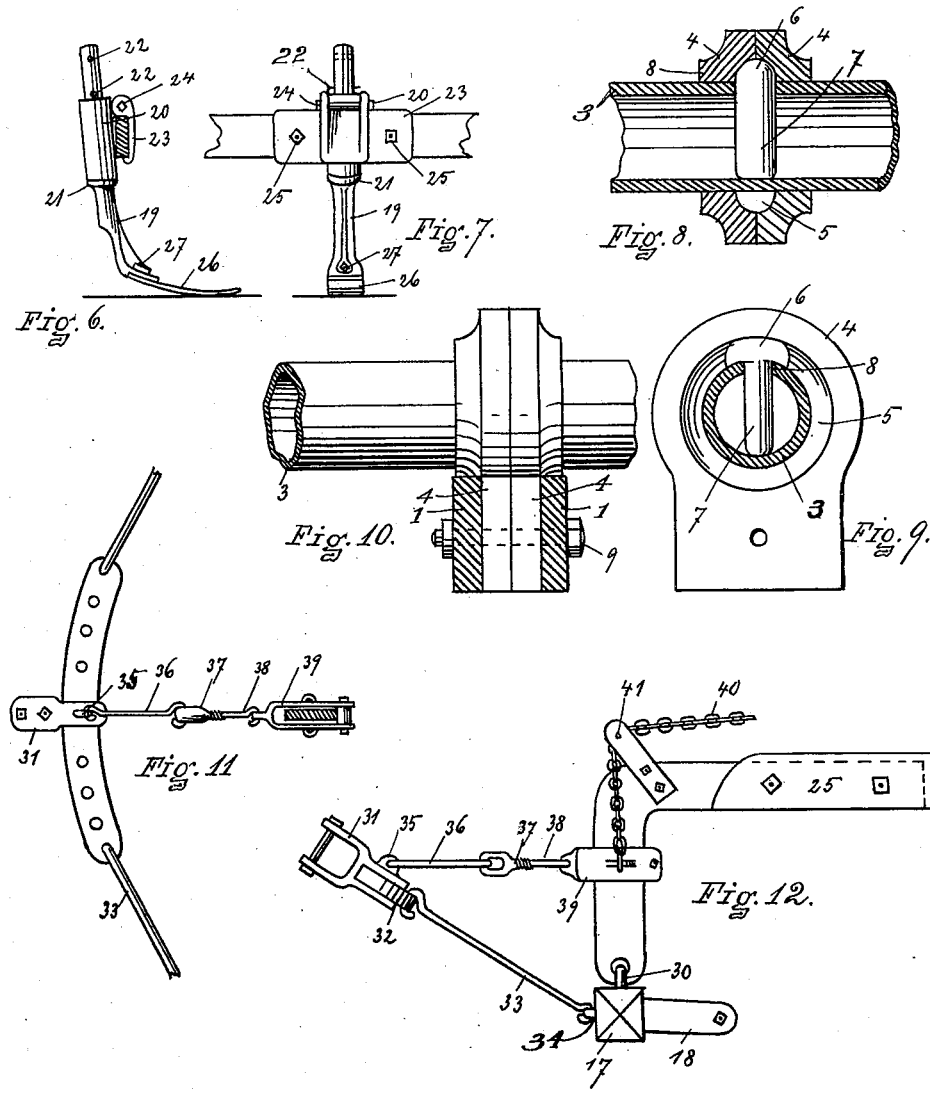
WITNESSES
Rich. A. George
Charles F. Duffenbacher
INVENTOR
EFFINGER E. WHIPPLE
By Riley Lane
ATTORNEY.

No. 636,371. Patented Nov. 7, 1899.
E. E. WHIPPLE.
LEVER HARROW AND RIDING ATTACHMENT.
(Application filed Mar. 4, 1898.)

(No Model.) 4 Sheets—Sheet 4.

WITNESSES
Rich. A. George
Charles F. Diffenbacher

INVENTOR
EFFINGER E. WHIPPLE
BY
Riley Lane
ATTORNEY.

UNITED STATES PATENT OFFICE.

EFFINGER E. WHIPPLE, OF UTICA, NEW YORK, ASSIGNOR TO THE STANDARD HARROW COMPANY, OF SAME PLACE.

LEVER-HARROW AND RIDING ATTACHMENT.

SPECIFICATION forming part of Letters Patent No. 636,371, dated November 7, 1899.

Application filed March 4, 1898. Serial No. 672,514. (No model.)

*To all whom it may concern:*

Be it known that I, EFFINGER E. WHIPPLE, a citizen of the United States of America, and a resident of Utica, Oneida county, New York, have invented certain new and useful Improvements in Lever-Harrows and Riding Attachments, of which the following is a specification.

My invention relates to a harrow and a riding attachment combined.

A general statement of the object and nature of my invention consists in providing a lever-harrow where the tooth-bars are operated by lever mechanism, the frame of which is supported and carried at a given height on elevated attachment, the wheels of which are located within the harrow-frame by arranging mechanism which will always carry the harrow-frame at a given height whether the teeth are in or out of operative engagement with the soil and at the same time leave the harrow-frame free to move above the horizontal line of the support of the frame.

The combination and arrangement of my invention contemplates the carrying of the harrow-frame in an elevated plane above the ground, whether the teeth are in or out of operative engagement with the soil, by providing a large clearance between the frame and the ground for the passage of trash and rubbish, which would otherwise tend to clog and render the harrow unsuited to use for the purposes for which harrows are employed, and at the same time leave the harrow free to oscillate or move in any direction and above the horizontal plane of the support. By my combination and arrangement of parts the riding attachment is in a sense practically independent of the harrow, and when a driver's seat is mounted on the wheel attachment the weight of the driver is carried on the riding attachment, which is drawn independently of the harrow, so that I combine all of the valuable features of a riding spring-tooth and a float spring-tooth harrow in one tool without incurring any of the disadvantages which arise from suspending the harrow-frame between the wheels upon an overhanging axletree.

Figure 13:
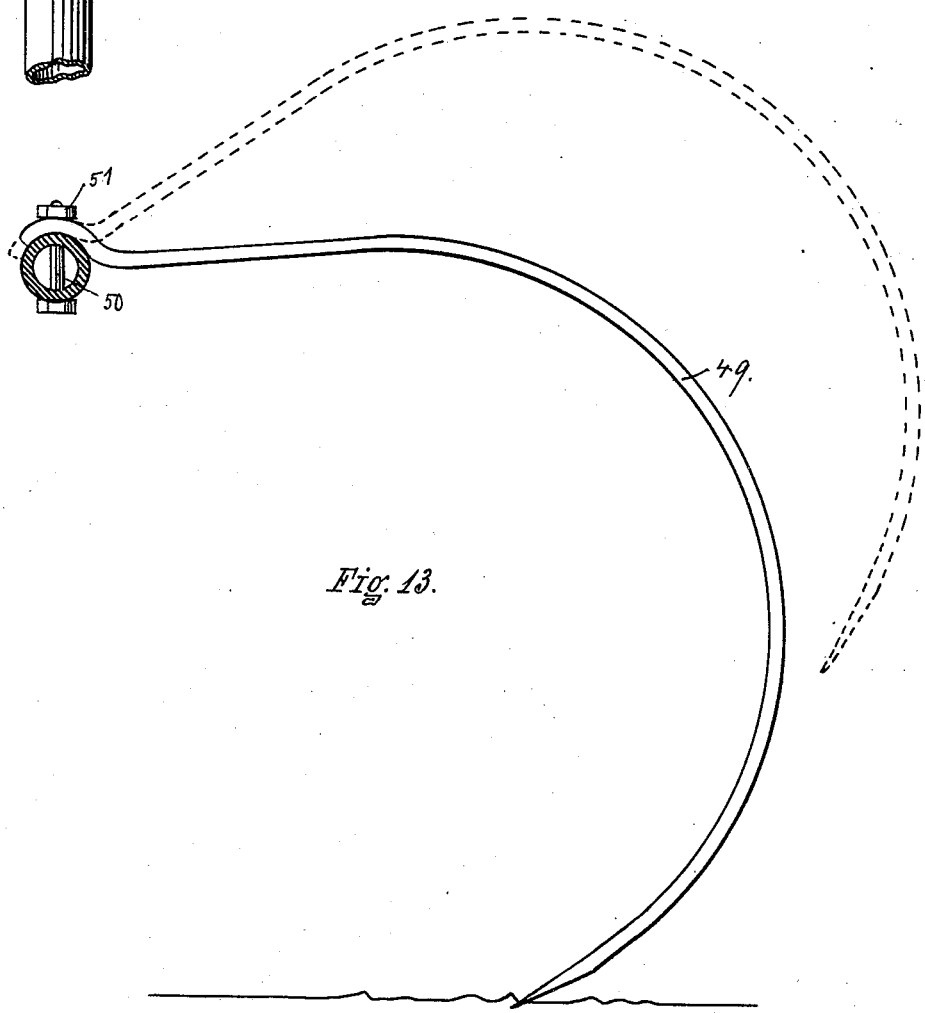

In elevating the frame-bars of the harrow above the horizontal plane of the ground I find it advantageous to provide and have invented for this purpose a new and useful tooth which is formed of spring-steel, substantially of the form shown in Figure 13 of the drawings, having a portion of its length substantially straight from the attaching-point toward the curve and curving downward, rearward, and forward to the working point. The straight portion adds stiffness to the bowed portion of the tooth, which would otherwise be elastic if the tooth were curved from its butt to its working point, and by this stiffening process I prevent the teeth on the rear bars of the harrow from trailing into the track cut by the teeth on the bars of the harrow in advance of the rear bar, and thus avoid leaving ridges of land uncut by the rear teeth. The trailing difficulty is found more or less in all spring-tooth harrows when used in stiff or hard soil, and this trailing tendency is increased in the proportion in which the frame-bars are elevated above the ground, and therefore to overcome these difficulties I provide the form of tooth indicated in Fig. 13 of the drawings, the butt of which has sufficient stiffness to hold the tooth to its work in hard or unyielding soil, and at the same time the curved portion of the tooth is sufficiently elastic to accomplish the beneficial result attained by the use of any curved-spring-tooth harrows employing teeth curved from their butts to their working points.

My invention also contains several other new and novel features, which will be hereinafter more particularly pointed out and claimed.

While my invention illustrated in the drawings is the best form of which I am aware to practice the same, yet I do not intend to limit myself to the construction or arrangement of the various parts, which may permit of large variations without departing from the spirit of my invention.

In the drawings, Figure 1 is a front perspective view of my improved harrow. Fig. 2 is a plan view of the same. Fig. 3 is a rear perspective view of my harrow, in the right-hand section of which harrow the teeth are shown in engagement with the soil, while in the left-hand section the teeth are elevated.

Fig. 4 is a side elevation of my harrow. Fig. 5 is a rear view of the riding attachment, showing the frame-supporting mechanism. Fig. 6 is a side elevation of the front depending support or shoe. Fig. 7 is a front view of the same. Fig. 8 is a horizontal sectional view of the tubular tooth-bar and the coupling-irons, the pin for holding the same in position being shown in full lines. Fig. 9 is a cross-section of Fig. 8, taken through the vertical center of the same. Fig. 10 is a side view of the coupling-iron and a side view of the tooth-bar. Fig. 11 is a top view of the mechanism for adjusting the draft of the harrow and riding attachment. Fig. 12 is a side view of the draft attachment. Fig. 13 is a side view of my improved tooth, the dotted lines showing its elevated position when the tooth-bar is operated by the lever mechanism. Fig. 14 is a top view of my improved tooth fastened to a section of the tubular tooth-bar.

In the drawings similar numerals and letters refer to corresponding parts in the several figures.

In constructing my harrow-frame I provide parallel sets of draft-bars 1 1 2 2, which extend the length of the frame and are mounted out of contact with turnable tooth-bars 3. The turnable tooth-bars and pairs of draft-bars are held together, yet out of contact, by pairs of coupling-irons 4 4. (Best illustrated in Figs. 8 and 9.) The face of each of the coupling-irons has an annular groove 5 (shown in Figs. 8 and 9) for the receipt of the head 6 of pin 7, which is inserted in the aperture 8 through the wall of the tubular bar for holding the side bars from movement on the tooth-bars and at the same time holding the tooth-bars from end thrust, and yet leave the turnable tooth-bars carrying the pins free to be rocked by lever mechanism. The two parts of the coupling-irons are placed on the tooth-bar in a separated condition and the pin inserted in the hole in the wall of the tooth-bar. Then the two parts of the coupling-irons are brought together into the position shown in Fig. 8, and the same are held between the two pairs of side bars by bolt and nut 9, Figs. 4 and 10, passing through the two side bars and through the shank (at Fig. 9 shown in front or side view) of the coupling-irons, the bolts and nuts being best shown in Figs. 4 and 10 and designated by the numeral 9. All of the turnable tooth-bars are provided with standards 10, Fig. 4, rigidly secured thereto at their lower ends and secured by a bolt and nut 11 at their upper ends to the connecting-bar 12, which carries ratchet-quadrant 13 for operating lever 14 by means of pawl 15, operated by the spring 16 on handle 14.

By the arrangement of the lever mechanism the teeth can be thrown in or out of operative engagement with the soil.

My harrow-frame is formed, preferably, in two or more independent sections, which permit of the independent vertical movement of each section. Each section is coupled at its front to an evener-bar 17, preferably at two points 18 18.

Each section of my harrow is supported, preferably at its front, by a depending frame-support 19, which in this instance is a swiveled shoe journaled in the bearing 20. (Best illustrated in Figs. 6 and 7.) The depending support is provided with shoulder 21, Figs. 6 and 7, which limits the downward movement of the bearing and is held in the bearing by pin 22, (best shown in Fig. 6,) which passes through the upper end of the support and is so arranged that the support 19 has a vertical movement or play in the bearing. By this arrangement the sections of the frame can be more easily elevated, and this adjustability permits of the shoe rising or falling under the varying conditions of use to which harrows are applied. The bearing for the depending frame-support is provided with a perforated projection to one side of the shoe, which engages with bracket 23, the two being held together by a bolt and nut at 24, (best shown in Fig. 6,) the bracket being bolted to the frame-bar at 25. (Best illustrated in Figs. 6 and 7.) By the combination of parts as herein described the shoe or frame-support may swing forward on the pivoted connection 24, and when swung into the vertical position shown in Fig. 6 the rear of the bearing strikes the frame-bar and holds the frame-support in substantially a vertical position for use. At the lower end or shank of the frame-support I provide a detachable shoe 26, which can be removed or replaced through the instrumentality of the bolt and nut 27, so that the same may be removed and replaced when worn or broken.

It is obvious that the frame-supports may be located at any convenient point on the frame to balance the same and partially carry the frame in an elevated plane above the ground. A sufficient number of them may be applied to accomplish this purpose, together with the other mechanism hereinafter pointed out.

I provide a substantially independent wheeled attachment, the wheels of which are arranged to run between the frame-bars of the harrow and drawn substantially independently of the harrow. In the drawings the wheels 27, Fig. 5, are supported and carried, preferably, by the overhanging axle 28, which preferably extends substantially the width of the harrow above the same. To this axle I rigidly attach draft-tongue 29, which extends, preferably, above the plane of the harrow and is connected at 30, Fig. 4, to the evener-bar 17, and by this arrangement the independent wheeled attachment is drawn, preferably, independently of the harrow.

It is obvious that the independent wheeled attachment might be drawn by attaching the draft-tongue to the front portion of the harrow-frame proper; but I prefer that the draft-tongue be attached to the evener-bar.

For adjusting the draft of the harrow and the independent wheeled attachment I provide clevis 31, which is provided with link 32, which receives hooked rod 33, which engages staple 34 in the front of the evener-bar, and on clevis 31 I provide loop 35, which receives swiveled hook 36, which engages swivel 37, carrying hook 38, which engages sliding connection 39, which is elevated or depressed by chain 40 running over sheave or pulley 41, located at the front end of the draft-tongue, the chain or connection 40 connected to lever 42, which is pivoted to the tongue at the bottom, the lever carrying the usual pawl and dog working on ratchet-quadrant 43, secured to the draft-tongue at 44. By this arrangement the driver can elevate or depress the draft attachment at the front of the harrow to vary its draft, according to the conditions and quality of the soil, at the pleasure of the operator. I mount driver's seat 45 on spring 46, the lower end of which is rigidly secured at 47 to the draft-tongue. The various figures of reference are best shown in Figs. 4 and 12 of the drawings.

For adjusting the sections of the frame to the draft attachment and for varying the same to accommodate different soils, and to unify the draft with the harrow and the independent wheeled attachment, I preferably provide on each side of each section adjusting-iron $b$, Fig. 4, which is provided with a series of horizontal holes $c$ for receiving bolt or pin $d$. By elevating or depressing coupling or draft iron 18 the draft on the harrow-sections may be raised or lowered at the will of the operator. The draft-iron $b$ has a flange or shank, which is held between the parallel draft-bars by bolt 9 passing through the same. By the union of this mechanism with the draft-attachment mechanism the draft may be adjusted to suit the circumstances of each particular condition of soil as may be found necessary to make the harrow and the independent wheeled attachment work properly together.

In the drawings the supporting connections between the wheeled attachment and the harrow are best illustrated in Fig. 5 and in this instance are shown to be chains 48 48 48 48, which are connected at their upper ends to the overhanging axle 28 and engaged at their lower ends to frame-bars 1 1 and 2 2. It is obvious that a great variety of changes may be made in the supporting connection between the wheeled attachment and the frame of the harrow without departing from the spirit of my invention, which, as before stated, consists in carrying the harrow-frame in an elevated plane above the ground when the teeth are in or out of operative engagement with the soil and at the same time leaving the harrow-frame free to oscilate and move above the plane of the support. The harrow may be supported in a given plane above the ground and its downward movement limited by cable or other equivalent means; but I prefer the flexible connecting support because it leaves the sections of the harrow-frame free to be elevated above the plane of the frame-support.

In carrying the frame-bars in an elevated position it permits all rubbish and trash to pass underneath the frame, and to prevent the excessive trailing of the harrow-teeth supported on the elevated frame I provide a new form of tooth 49. (Best illustrated in Figs. 13 and 14.) The peculiarities of my tooth consist in having a portion of its butt in the rear of the attaching-bar substantially straight, the straight portion terminating in a downward rearwardly and forwardly projecting curve, leaving the entire bowed portion of the tooth in the rear of the bar and the main portion of the bow of the tooth below the horizontal level of the tooth-bar. By this arrangement the butt of the tooth is strengthened in its lateral tendency to spring and the bowed and working points of the tooth are sufficiently elastic to accomplish all the valuable features attained in a tooth which is formed in a continuous curve from butt to point. The extreme butt of the tooth terminates in a bend on the tooth-bar and in the drawings is attached to the tooth-bar by bolt 50, passing through the bar and the tooth, and held together by nut 51, Fig. 13, as this form of tooth requires very strong fastening to the bar. By the construction and arrangement of the tooth in the form illustrated in Figs. 13 and 14 when the teeth are elevated out of contact with the soil by the lever mechanism a large clearance is given to the tooth, which is provided with a pitch which allows all trash and rubbish which may have accumulated on the tooth when the same is at work to drop off, and by the forward movement of the harrow in its elevated position the supports heretofore described give a large and free clearance for rubbish under the harrow and the harrow-teeth.

The words "lever-harrow" wherever the same are used in this specification are intended to be limited to a harrow having turnable tooth-bars which are rocked by the ordinary lever mechanism, and wherever the words "lever curved-spring-tooth harrow" or "curved-spring-tooth harrow" are employed they are intended to be limited to a harrow having curved spring-teeth attached to turnable tooth-bars operated by ordinary lever mechanism.

I do not intend to limit myself to the method of fastening the tooth to the bar, but consider that any suitable mechanism may be employed so long as the extreme butt of the tooth terminates in a curve conforming to the shape or form of the tooth-bar.

What I claim as new, and desire to secure by Letters Patent, is—

1. A lever-harrow provided with frame-supports, in combination with an independent wheeled attachment, the wheels arranged to run within the harrow-frame and supporting connections between the wheeled attachment and the harrow-frame whereby the harrow-frame is supported in a given horizontal plane above the ground and is free to move above the plane of the supports.

2. A lever-harrow composed of sections provided with depending frame-supports, in combination with a wheeled attachment, the wheels arranged to run within the sections of the harrow-frame and supporting connections between the wheeled attachment and each section of the harrow-frame, whereby the sections of the harrow-frame are supported in a plane above the ground and the harrow is free to move above the plane of the supports.

3. A lever curved-spring-tooth harrow with depending frame-supports, in combination with a wheeled attachment, the wheels, arranged to run within the harrow-frame and the supporting connections between the wheeled attachment and the harrow-frame whereby the harrow-frame is supported in a plane above the ground and is free to move above the plane of the supports.

4. A sectional lever curved-spring-tooth harrow, each section having a depending frame-support, in combination with a wheeled attachment, the wheels arranged to run within the harrow-frame and supporting connections between the wheeled attachment and each section of the harrow-frame whereby the sections of the harrow-frame are supported in a plane above the ground and are free to move above the plane of the supports.

5. A lever-harrow provided with depending frame-supports, in combination with a wheeled attachment, the wheels arranged to run within the harrow-frame, a draft-tongue rigidly secured to the axle and a flexible connection at the point at which it is connected to the harrow-draft, the draft-tongue between its two points of connection being rigid and supporting connections between the wheeled attachment and the harrow-frame, whereby the harrow-frame is supported independently in an elevated plane above the ground, and is free to move above the plane of the support.

6. A lever curved-spring-tooth harrow, in combination with an independent wheeled attachment, the wheels arranged to run within the harrow-frame, supporting connections between the wheeled attachment and the harrow-frame, whereby the harrow-frame is supported in an elevated plane, and is free to move above the plane of the support.

7. A sectional lever curved-spring-tooth harrow, in combination with an independent wheeled attachment, the wheels of the attachment arranged to run within the frame of the sections of the harrow, and supporting connections between the independent wheeled attachment and the sections of the harrow-frame, whereby the sections of the harrow-frame are supported in a plane above the ground and are free to move above the plane of the support.

8. A lever curved-spring-tooth harrow, in combination with a wheeled attachment, the wheels arranged to run within the harrow-frame, a rigid draft-tongue, connecting the wheeled attachment to the draft of the harrow and supporting connections between the wheeled attachment and the harrow-frame, whereby the harrow-frame is supported loosely in a plane above the ground, and is free to move above the plane of the support, for the purposes stated.

9. A sectional lever spring-tooth harrow, in combination with a wheeled attachment, the wheels arranged to run within the sections of the harrow, a rigid draft-tongue made adjustable with the draft of the harrow and supporting connections between the wheeled attachment and the several sections of the harrow-frame, whereby the sections of the harrow-frame are supported loosely in a plane above the ground, and are free to move above the plane of the support.

10. A lever-harrow in combination with a wheeled attachment, the wheels arranged to run within the contour of the harrow-frame, a draft-tongue secured rigidly to the axle between the wheels and flexibly connected at its front to the draft of the harrow, and supporting connections between the wheeled attachment and the frame, whereby the harrow-frame is supported loosely in a plane above the ground, and is free to move above the plane of the supports.

11. A lever-harrow, having tooth-bars running substantially at right angles to the line of draft, in combination with a wheeled attachment, the wheels arranged to run within the harrow-frame, a draft-tongue rigidly connected between the wheels and flexibly connected with the draft of the harrow, supporting connections between the harrow-frame and the wheeled attachment and means for balancing the harrow-frame whereby the frame can be supported loosely in a plane above the ground and leave the harrow-frame free to move above the plane of the supports.

12. A lever-harrow provided with depending frame-supports in combination with a wheeled attachment, the wheels arranged to run within the harrow-frame, a rigid draft attachment connecting the wheeled attachment with the draft of the harrow, and mechanism substantially as set forth for adjusting the coöperation of the parts of the harrow and wheeled attachment, whereby the harrow-frame is carried in a plane above the ground, and is left free to move above the plane of the support.

13. A lever-harrow having depending frame-supports, in combination with a wheeled attachment, the wheels arranged to run within the harrow-frame, a draft-tongue rigidly connected between the wheels to the axle and at the front end, adjustably connected to the draft of the harrow, means for supporting the harrow-frame in an elevated plane above the ground, and leaving the frame free to move above the plane of the support, and a lever-operative adjusting mechanism for adjusting the draft of the harrow and the wheeled attachment, substantially as set forth.

14. A harrow, in combination with frame-supporting shoes mounted in bearings to swing or turn, an independent wheeled riding attachment the wheels located within the frame, the riding attachment being drawn by the draft of the harrow, and means substantially as set forth for carrying the harrow-frame in a given plane above the ground and leaving the same free to move above the plane of the support, substantially as set forth.

15. A harrow, in combination with depending frame-supporting shoes provided with removable points and made turnable in sockets, secured to the frame, an independent wheeled attachment, the wheels located within the frame, connections between the wheeled attachment and the draft of the harrow, means for carrying the harrow-frame in a given plane when the teeth are in or out of operative engagement with the soil, for the purposes stated.

16. In a harrow, the combination of substantially parallel draft-bars and tubular tooth-bars running at an angle to the draft-bars, the tooth-bars being made turnable by lever mechanism, coupling-irons formed in two parts annularly recessed on their inner faces, a pin inserted in the wall of the tubular tooth-bar, the head of the pin fitting into the annular opening in the face of the couplings, substantially as set forth.

17. A lever-harrow, having dependent frame-supports for carrying the frame in a plane above the ground, in combination with a wheeled attachment, the wheels running within the frame-bars of the harrow, the harrow and wheeled attachment connected to be drawn together, and means substantially as set forth for carrying the harrow-frame in an elevated plane above the ground and leaving the harrow free to move above the plane of the support, substantially as set forth.

18. A harrow having depending frame-supports for carrying the frame in a plane above the ground, in combination with a wheeled attachment, the wheels arranged to run within the frame of the harrow, the wheeled attachment and harrow adjustably connected to the draft and connecting means between the axle of the wheeled attachment and the frame of the harrow whereby the harrow-frame can be carried in an elevated plane above the ground, and left free to move above the plane of the support, for the purposes stated.

19. A lever-harrow and an independent wheeled attachment, the wheels located within the frame of the harrow, in combination with mechanism substantially as set forth, for connecting and drawing the harrows and wheeled attachment together, and whereby the harrow is free to move above the plane of its support, when the teeth are in or out of engagement with the soil, for the purposes stated.

20. A lever-harrow frame provided with depending frame-supporting shoes, the lever-operative tooth-bars provided with flat curved spring-teeth, secured at their butts to the tooth-bars, the tooth having a portion of its length substantially straight terminating in a curve downward, rearwardly and forwardly, leaving the bowed portion of the tooth in the rear of the tooth-bar, and a wheeled attachment, the wheels running within the harrow-frame and means substantially as set forth for carrying the harrow-frame in an elevated plane above the ground and leaving the frame free to move above the plane of the support, for the purposes stated.

Signed by me at Utica, New York, this 24th day of February, 1898.

EFFINGER E. WHIPPLE.

Witnesses:
　PHEBE A. TANNER,
　DWIGHT H. COLEGROVE.